2 Sheets—Sheet 1.
J. T. KING.
AGRICULTURAL STEAMERS.
No. 193,966. Patented Aug. 7, 1877.
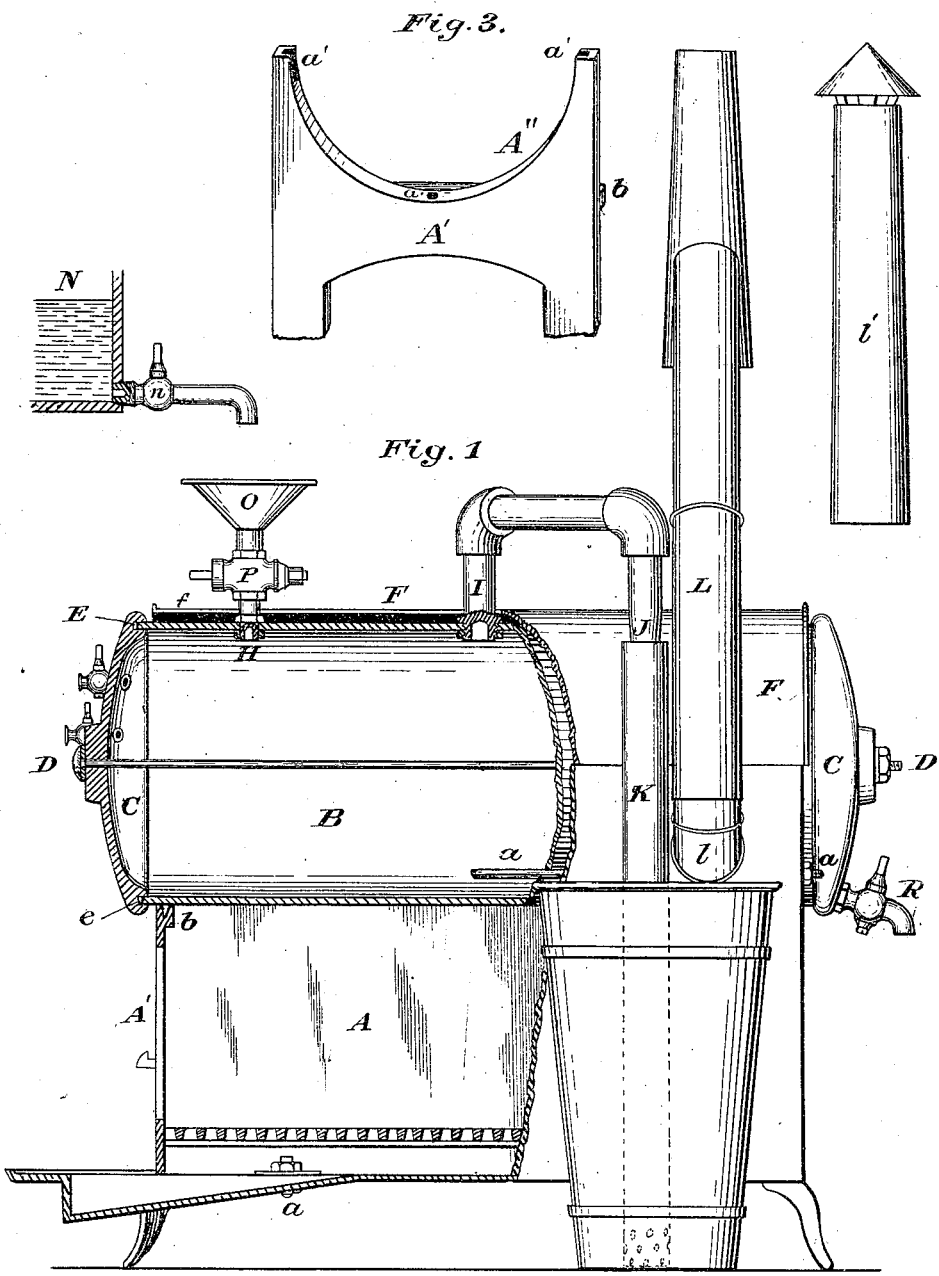

J. T. KING.
AGRICULTURAL STEAMERS.
No. 193,966. Patented Aug. 7, 1877.
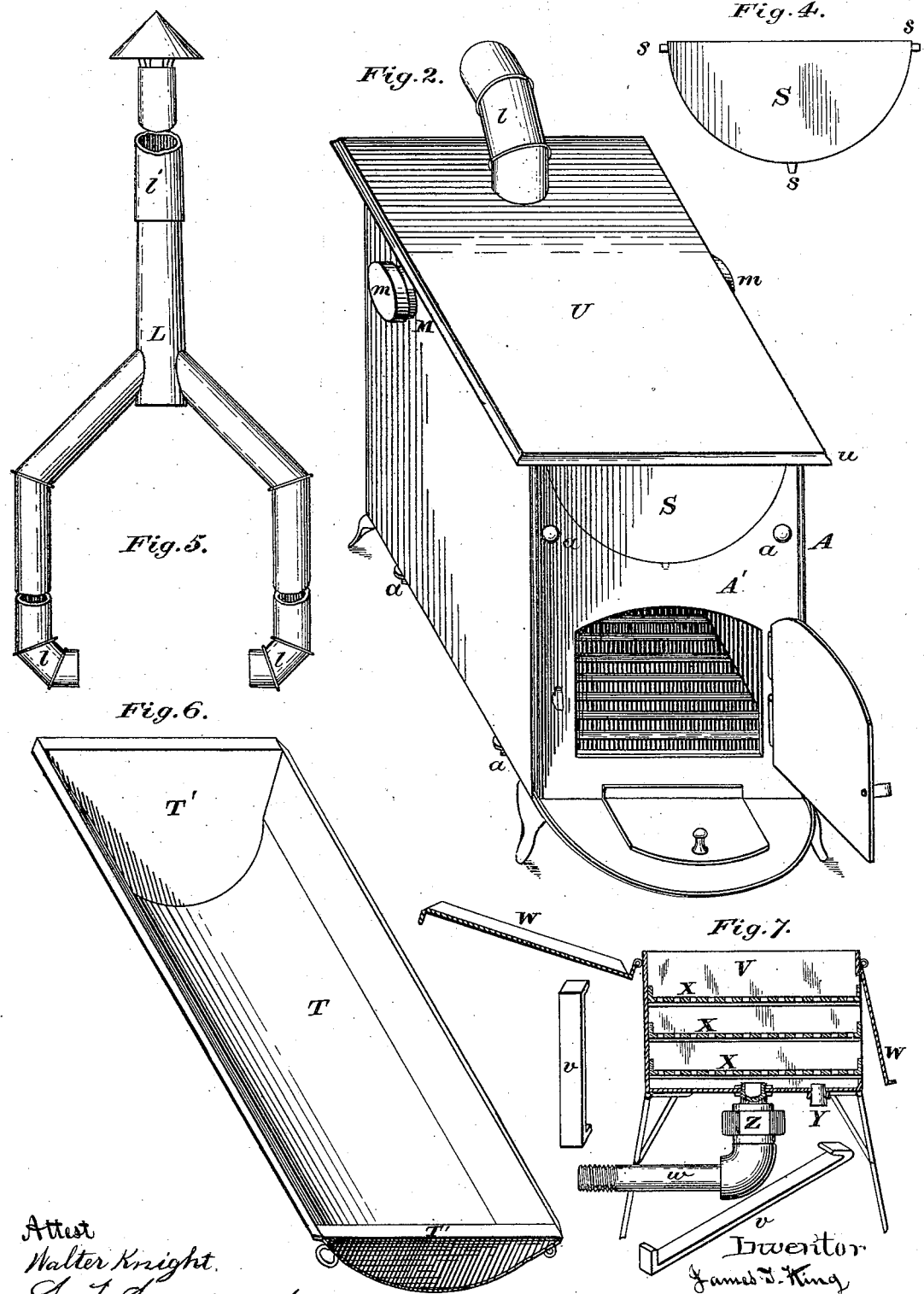

UNITED STATES PATENT OFFICE.

JAMES T. KING, OF GREENVILLE, OHIO.

IMPROVEMENT IN AGRICULTURAL STEAMERS.

Specification forming part of Letters Patent No. 193,966, dated August 7, 1877; application filed May 18, 1877.

*To all whom it may concern:*

Be it known that I, JAMES T. KING, of Greenville, Darke county, Ohio, have invented certain new and useful Improvements in Agricultural Steamers, of which the following is a specification:

My apparatus is primarily designed to be used for various agricultural purposes, such as steaming food for cattle, sugar-making, drying fruit, &c., and is so constructed as to be easily taken apart or put together by any one. The fire-box is also capable, by a slight change, of being used as a house-warming stove, in the ordinary manner; or, by providing the boiler with a safety-valve, the apparatus may be used for a light power.

My stove consists, essentially, of a rectangular box the upper edges of whose ends have concave openings for the reception of a cylindrical steam generator or a semi cylindrical kettle. The smoke-pipe is forked, so as to straddle the boiler or kettle. The ends of said boiler, instead of being riveted, are held in place by a tie-bolt extending the whole length of the boiler, and passing through both heads. The boiler is provided with a steam-pipe, that conveys the steam to an open-topped barrel containing food to be cooked. The semi-cylindrical kettle, above alluded to, takes the place of the steam-generator when it is desired to use the apparatus for sugar-making or for heating water. To these members is added a rectangular steam-box, having one or more perforated shelves, whereon several different kinds of food may be cooked at the same time.

In the accompanying drawings, Figure 1 represents my improved steamer, partly in axial section and partly in elevation. As shown, it is in position for steaming food in a vat or other suitable receptacle. Fig. 2 is a perspective view of my stove in its ordinary condition as a furnace. Fig. 3 represents a portion of the stove-front, showing the concavity. Fig. 4 represents one of two cast-iron end pieces to fit in the concavities in the end plate when the boiler is removed. Fig. 5 shows my peculiar form of stove-pipe. Fig. 6 is a perspective view of the semi-cylindrical kettle. Fig. 7 is a sectional view of my steam-box.

In the drawing, A is my furnace or fire-box, the plates of which are held in place by bolts $a$, and it may be made with or without a grate, and with or without a bottom-plate and legs.

The end plates A' have, in their upper edges, semicircular openings A'', and are strengthened by a rib, $b$, on which rests the boiler B. The ends C of the boiler are made of cast-iron, and of bulging shape, as shown. A tie-bolt, D, passing through the center of each end, binds them tightly against the cylindrical portion of the boiler, thus forming a much cheaper and simpler construction than by riveting, and, for the purpose for which it is designed, more efficient, as it enables the boiler-heads to be easily and quickly removed for cleansing or repairing, or for permitting the body to be used as a packing-case for the smaller members. The edges of the cylindrical portion of the boiler rest against an india-rubber gasket, $e$, in an annular groove, E, cast in the boiler-heads, so as to secure a steam-tight joint. A shell or jacket, F, surrounds the upper half of the boiler, inclosing an air-space, for the purpose of retaining the heat. It is put on endwise, and has an opening, $f$, in the top for the funnel-pipe H and the steam-pipe I. Said steam-pipe has two or more elbows, that form a swinging or universal joint, according to the number used, and it also has a tapering ground joint, J, for the ready and steam-tight attachment of a pipe, K, which pipe extends down into a barrel or other vessel, and has perforations at the bottom to allow the steam to escape.

The stove-top U simply rests upon the body A, and is secured from lateral movement by downwardly-projecting flanges $u$.

The stove-pipe L is of "breeching" form, having two elbows, $l$, below and united in a single stack above, as shown in Fig. 5. The elbows spring onto necks or collars M, that are shown in Fig. 2. These necks M, when not in use, are covered with caps $m$. The breeching can be rotated on the necks M like a hinge, so as to be lowered into a horizontal position out of the way when desired.

A reservoir, N, may be placed in an elevated position above the boiler, and water drawn from it by a cock, n, into the funnel O, that also has a stop cock, P, attached.

Hot water may be drawn from the boiler by the cock R. Each end plate of the stove is furnished with a semicircular plate, S, (represented in Figs. 2 and 4,) cast with three studs, s, on its periphery, that fit into holes a' in the end plates of the stove.

Formed to occupy the concave open-topped stove or fire-box A, and to project in both directions longitudinally beyond it, is an open semi-cylindrical kettle, whose body T is composed of sheet metal that is bent around, and firmly attached to wooden heads or end pieces T', which (in consequence of the said kettle's excess of length over the fire box) are out of contact with the fire. A cock may be inserted in one end of the kettle for withdrawing hot water.

The steam-box V is provided with two lids, W, which constitute, respectively, the top, and one of the sides of the box. These lids are held closed by clamps v. The steam enters by pipe w through the bottom of the chest V, and ascends through the perforations in the shelves X, and any water of condensation can be let out through opening Y in the bottom. The steam-pipe has a swivel joint, Z, which allows the box to be moved without breaking connection.

By the simple construction of my apparatus it can be made cheap enough to be within the reach of the majority of farmers, while by reason of its convertible nature it can be used instead of many special apparatus, and the purchaser can buy the stove alone, and add to it any or all of the appendages as he is able.

By making the kettle of greater length than the stove, so that its end portions project beyond the same, and are out of direct contact with the fire, I secure large capacity, coupled with a capability of employing wooden heads, as above described. A kettle so formed can be manufactured by any mechanic out of sheet metal and wood, at a moderate expense, and will retain its shape as well as one of much stouter material made wholly of metal.

When employed for simply room-warming purposes, the stove is put into the condition shown in Fig. 2, the semicircular plates S, the top plate U, and the caps m, being in place, and one of the elbows l or the pipe l' being used at the smoke-vent, according to whether the stove is to be employed indoors or without. When the box V is to be used for drying fruit, the pipe w is removed, and the box placed upon the stove-top U.

I claim as new and of my invention—

1. In combination, with a cylindrical kettle or generator, substantially as represented, the stove or fire-box A, capable of being thrown open at top, and whose end plates have semicircular indentations A'', for the reception of such kettle or generator, substantially as set forth.

2. The combination of necks or collars M and swinging breech-flue L on opposite sides of the stove, communicating with a suitable separable stack or chimney, substantially as set forth.

3. In combination, the following elements, to wit: A stove, A, having necks or collars, M, for breech-flue L, a concave open-top, and a kettle or steam-generator, B, fitting the same, substantially as and for the purpose set forth.

4. In combination with the open-topped stove A, the cylindrical steam-generator B, having the annular grooves c, heads C, funnel O, and jointed steam-pipe or goose-neck I K, substantially as set forth.

5. In combination with a cylindrical steam-generator or cooking vessel, B, the stove A, having semicircular removable end panels S, and separable top U, substantially as and for the purpose set forth.

6. In combination with the open-topped stove A, having semicircular end depressions A'', and side necks M, the cylindrical steam-generator B, and the forked smoke-pipe or breeching L, substantially as set forth.

In testimony of which invention I hereunto set my hand.

JAMES T. KING.

Attest:
GEORGE H. KNIGHT,
LE BLOND BURDETT.